May 29, 1956  G. PETERSON  2,747,356
LAWN MOWER GRASS COLLECTOR
Filed Dec. 27, 1954  2 Sheets-Sheet 1

INVENTOR.
George Peterson
—BY—
Frank E. Liverance Jr.
Attorney

May 29, 1956 G. PETERSON 2,747,356
LAWN MOWER GRASS COLLECTOR
Filed Dec. 27, 1954 2 Sheets-Sheet 2

INVENTOR.
George Peterson
-BY-
Frank E. Liverance, Jr
Attorney

United States Patent Office
2,747,356
Patented May 29, 1956

2,747,356

LAWN MOWER GRASS COLLECTOR

George Peterson, North Muskegon, Mich.

Application December 27, 1954, Serial No. 477,896

3 Claims. (Cl. 56—202)

This invention relates to a grass catcher and holder which is designed to be connected at one side of a power driven lawn mower by which grass, weeds and the like are cut by a horizontally located, rotating cutter blade or arm connected at one end to a vertical spindle which is motor driven at high speed. The grass and the like which is cut is thrown with force laterally or to one side and the grass collector which I have invented is secured in place on the lawn mower so that the thrown grass is received therein, being thrown with force and directed within the grass receiving receptacle to the rear and packed against a rear closure therefor. Such closure is detachably held in closed position when in use but is readily moved to an open position to dump the grass, weeds, fallen leaves and the like when the collecting receptacle has been wholly or partially filled.

An understanding of the invention may be had from the following description, taken in connection with the accompanying drawings, in which, Fig. 1 is a rear elevation of the grass collecting receptacle of my invention.

Like reference characters refer to like parts in the different figures of the drawings.

Figure 1:
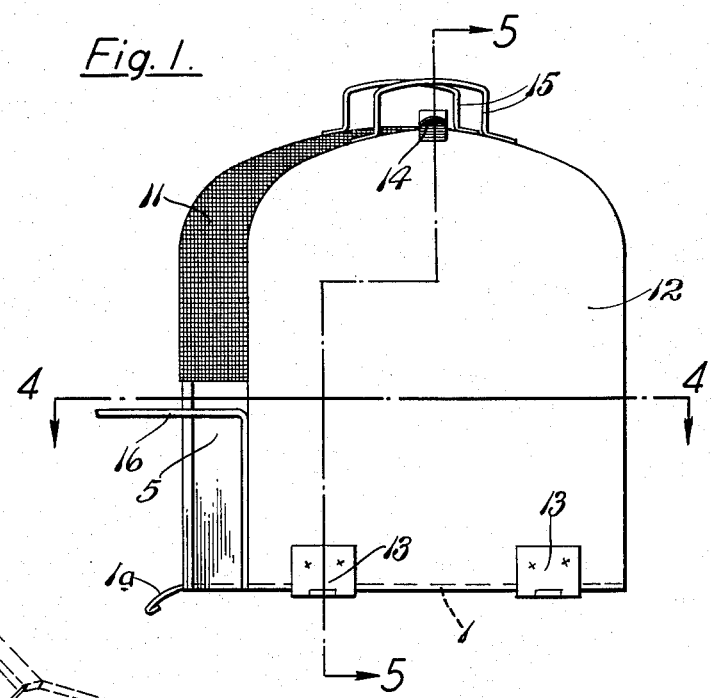
Figure 4:
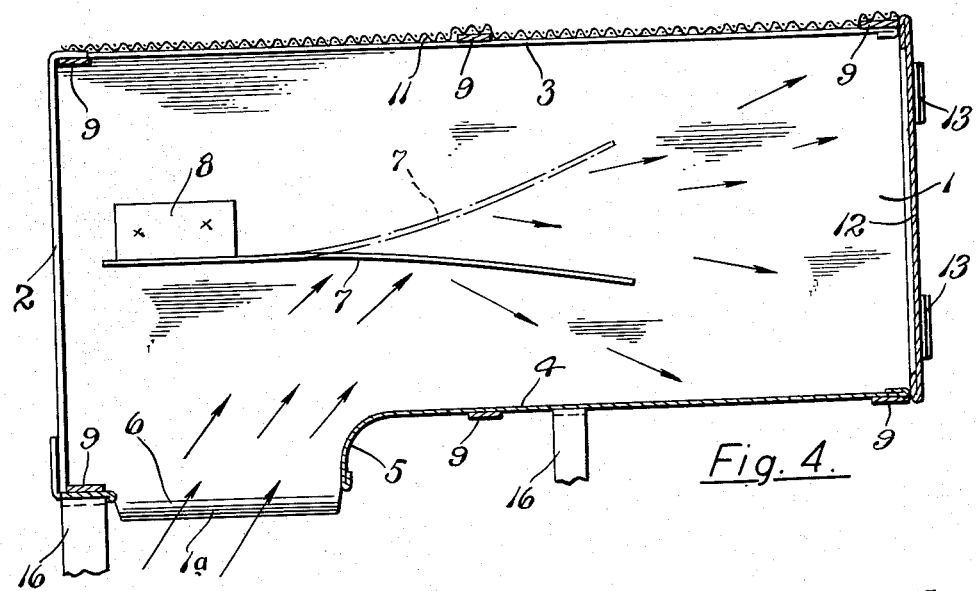
Fig. 4 is an enlarged horizontal section substantially on the plane of line 4—4 of Fig. 1 looking downwardly.

In the structure which preferably embodies my invention, a horizontal generally rectangular bottom 1 of sheet metal has a short flange 2 extending upwardly at its front end, a second longitudinal flange 3 likewise extending upwardly at its outer side and an inner flange 4 of greater width than the flange 3 which, in front of the middle of said base, is curved outwardly for a short distance as indicated at 5 and is then continued forwardly. In the forward continuation of flange 4 a relatively large rectangular opening 6 is made, flush at its lower side with the bottom 1. The bottom of the lateral extension at the lower end of opening 6 is curved downwardly and outwardly at 1a (Figs. 1 and 4).

A vertical baffle 7 at its front end portion has a laterally turned horizontal foot 8 located against the upper side of the bottom 1, bing welded, soldered, brazed or otherwise permanently secured thereto. The rear portion of the baffle back of such foot member 8 is free for bending so that it may occupy different positions, one of which is shown in full lines and the other in dot and dash lines in Fig. 4. The baffle extends toward but terminates short of the rear end of the grass collecting receptacle.

The base structure thus described has secured thereto a plurality of spaced, inverted U-shaped hoops 9 also of sheet metal one at each of the front and rear ends of the receptacle and one substantially midway between the ends. The upper portions of said hoops are secured to a longitudinal strip 10 also of sheet metal laid thereon, welded, soldered or otherwise permanently secured thereto. Such hoops are covered by a screen 11, as shown, completing the receptacle at its sides and top.

Figure 2:
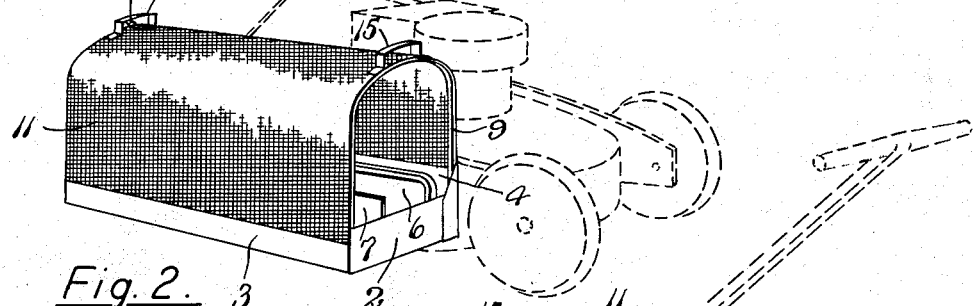
Fig. 2 shows on a reduced scale in perspective such receptacle as it is attached and located to one side of a power lawn mower, said mower being shown in dash lines.
Figure 3:
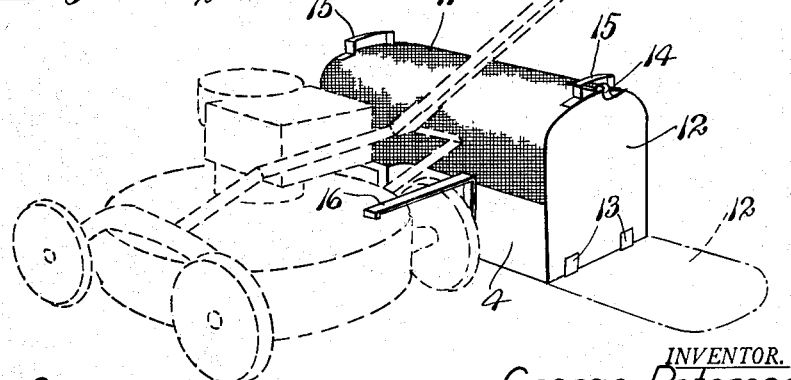
Fig. 3 is a perspective view similar to Fig. 2, but with the lawn mower shown as moving in the opposite direction so as to show the receptacle in perspective opposite to the position shown in Fig. 2.
Figure 5:
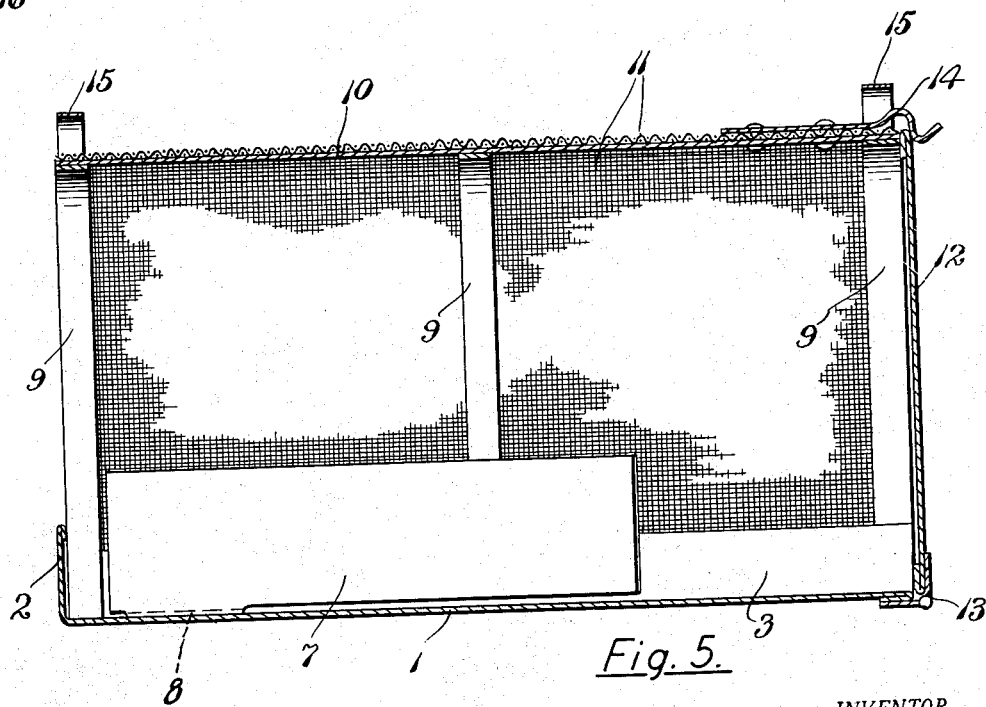
Fig. 5 is a longitudinal vertical section substantially on the plane of line 5—5 of Fig. 1.

The front end of the receptacle may be left open, and is shown open in the drawings. Such open front end of the receptacle is not essential to the invention and closing thereof may be provided though it is not necessary. The rear end of the receptacle is closed by a door 12, also of sheet metal, hingedly connected by hinges 13 at its lower edge to the rear end of the bottom 1. When moved to closed vertical position (Fig. 5) it is releasably held in place by a releasable spring catch 14. The grass collecting receptacle is provided with front and rear handles 15 at its upper side for convenient carrying and at its inner side has arms 16 secured to the side 4 which may be extended laterally and detachably secured in any preferred manner to a power lawn mower. Such mower is shown in dash lines in Figs. 2 and 3.

When thus secured in place, the grass receiving receptacle is to one side of the lawn mower moving therewith in its movements and with the opening at 6 positioned so that cut grass, weeds, fallen leaves and other refuse are projected by the rapidly rotating cutting arm or blade of the mower through such opening. The grass, weeds, leaves or other debris has a movement laterally and to the rear accompanied by air currents set up by the rotating arm of the mower. Such debris comes against the baffle 7 and is carried to the rear around the rear free end thereof and packed against the closure 12 which is held in vertical position as in Fig. 5. The baffle is easily bent or swung to different positions in accordance with the condition of the grass or the like, whether it is short or long, and also with reference to fallen leaves in accordance with the greater or less quantities thereof which are on the ground. The air escapes through the screen 11. The rear closure door 12 may also have screen sections therein if desired or such closure may have a large number of openings therethrough for air escape though not necessarily so. When the grass and the like have filled the receptacle at its rear portion and nearly to its front end, the receptacle may be removed and dumped by opening the closure door 12.

The structure described has proved exceptionally practical and useful for the purposes for which it was produced. It is light in weight, but sturdy and durable in its construction and may be made at low cost.

The invention is defined in the appended claims and is to be considered comprehensive of all forms of structure coming within their scope.

I claim:

1. Structure as described comprising, a receptacle having a bottom, spaced sides and top, an open rear end and a movable detachably secured closure for said rear end, said top and sides of the receptacle having air passing openings therethrough and one side of said receptacle at its front lower portion having a relatively large opening therethrough, and a baffle secured at its front portion to, located over, and extending from said bottom toward but short of the top spaced from both sides of said receptacle, said baffle having a free rear portion extending toward but terminating short of the rear end of the receptacle adapted to be moved laterally toward either side of said receptacle and remain in any position to which moved.

2. Structure as described comprising, a receptacle having a horizontal bottom, spaced vertical sides, a top and an open rear end, a movable closure for the open end, means for releasably securing said closure in closed position, said sides and top having air passing openings, the lower portion at one side at the front thereof having a relatively large opening therethrough and a baffle of thin, bendable material secured at one end to said bottom near the front of the receptacle, said baffle extending from said bottom toward said top but having its upper edge below the top and having a free rear portion extending toward but short of the rear open end of the receptacle, said baffle being located between and spaced from both sides of the receptacle.

3. A structure as described comprising, a receptacle having a horizontal bottom of generally rectangular form and at each longitudinal edge thereof an upwardly extending vertical side flange, one of said flanges adjacent the front thereof having a relatively large opening therethrough, vertical sides connected to said flanges extending upwardly therefrom, and a top between the upper portions of said vertical sides, a closure at the rear end of said receptacle mounted for movement to closed or open positions, and a vertical longitudinal bendable baffle of thin material located generally lengthwise of and within said receptacle secured at its front end portion to said bottom extending toward but short of the rear end of the receptacle, said baffle being located between and spaced from the sides of the receptacle and having a height materially less than the height of said receptacle, and said baffle being adapted to be laterally bent back of its front connected end to different positions.

References Cited in the file of this patent

UNITED STATES PATENTS

| | | |
|---|---|---|
| 1,669,471 | Jones | May 15, 1928 |
| 2,361,637 | Lothrop | Oct. 31, 1944 |
| 2,390,321 | Packwood | Dec. 4, 1945 |
| 2,641,100 | Sylvester | June 9, 1953 |